3,398,136
BENZOPHENONE MONOAZO DYES
Wolfgang Groebke, Oberwil, Basel-Land, and Curt Mueller, Basel, Switzerland, assignors to Sandoz Ltd. (also known as Sandoz A.G.), Basel, Switzerland
No Drawing. Filed May 19, 1966, Ser. No. 551,231
Claims priority, application Switzerland, July 12, 1965, 9,732/65
12 Claims. (Cl. 260—207)

ABSTRACT OF THE DISCLOSURE 2-benzoylphenyl-azo-(4-tert. amino)benzene dyes produce dyeings which are fast to light, thermofixation, sublimation, pleating, gas fumes, cross-dyeing, dry cleaning, chlorine and wet tests.

---

This invention relates to azo dyes of the formula

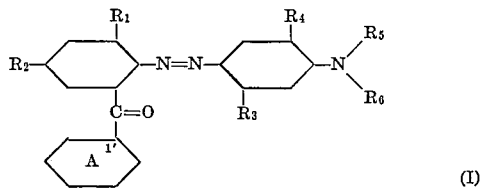

(I)

where
$R_1$ represents a hydrogen or halogen atom or a nitro cyano, alkylsulfonyl, arylsulphonyl, aralkylsulfonyl or sulfonamide group, the last of which may be substituted by alkyl radicals,
$R_2$ a nitro, alkylsulfonyl, arylsulfonyl, aralkylsulfonyl, carboxylic acid ester, carboxylic acid amide or sulfonamide group, the last of which may be substituted by alkyl radicals,
$R_3$ a hydrogen atom or an alkyl, alkoxy, alkylamino, alkoxyalkylamino, alkoxycarbonylamino, phenyloxycarbonylamino, acylamino or methylsulfonylamino group,
$R_4$ a hydrogen atom or an alkyl or alkoxy group,
$R_5$ an alkyl, hydroxyalkyl, alkoxyalkyl, alkoxycarbonylalkyl, alkoxycarbonyloxyalkyl, acylalkyl or acyloxyalkyl group, and
$R_6$ an alkyl, hydroxyalkyl, alkoxyalkyl, alkoxycarbonylalkyl, alkoxycarbonyloxyalkyl, acylalkyl or acyloxyalkyl group;

all the aforesaid alkyl and alkylene radicals being lower alkyl and alkylene radicals which bear 1 to 4, preferably 1 to 2 carbon atoms and may be substituted by cyano radicals or halogen atoms, and the benzene nucleus A may be substituted by non-water-solubilizing groups, preferably alkyl or alkoxy groups.

The process for the production of the said dyes consists in the diazotization of an amine of formula

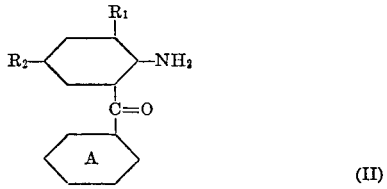

(II)

and subsequent coupling of the diazo compound with an amine of formula

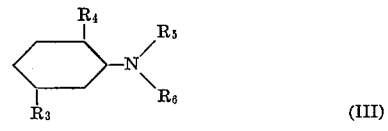

(III)

The following are enumerated as examples of diazo components especially suitable for the present process:

2-amino-5-nitrobenzophenone,
2-amino-3,5-dinitrobenzophenone,
2-amino-3,5-dinitro-4'-methylbenzophenone,
2-amino-3,5-dinitro-4'-methoxybenzophenone,
2-amino-3-chloro-5-nitrobenzophenone,
2-amino-3-chloro-5-nitro-4'-methylbenzophenone,
2-amino-3-chloro-5-nitro-4'-methoxybenzophenone,
2-amino-3-bromo-5-nitrobenzophenone,
2-amino-3-bromo-5-nitro-4'-methylbenzophenone,
2-amino-3-bromo-5-nitro-4'-methoxybenzophenone,
2-amino-3-methylsulfonyl-5-nitro-benzophenone,
2-amino-5-methylsulfonylbenzophenone,
2-amino-3-dimethylaminosulfonyl-5-nitrobenzophenone,
2-amino-5-dimethylaminosulfonylbenzophenone,
2-amino-3-chloro-5-methylsulfonylbenzophenone,
2-amino-3-bromo-5-methylsulfonylbenzophenone.

Examples of preferred coupling components are:

N-ethyl-N-2'-cyanoethylaniline,
N-2'-hydroxyethyl-N-2'-cyanoethylaniline,
N-2'-acetoxyethyl-N-2'-cyanoethylaniline,
N,N-2',2'-di-(acetoxyethyl)-aniline,
N-ethyl-N-2'-hydroxyethyl-3-toluidine,
N-2'-cyanoethyl-N-2'-acetoxyethyl-3-toluidine,
N,N-di(2'-acetoxyethyl)-3-toluidine,
N,N-diethyl-amino-3-propionyl-anilide,
N,N,-di-(2'-hydroxyethyl)-amino-3-acetanilide,
N,N-di(2'-acetoxyethyl)-amino-3-methylsulfonylanilide,
(N-2'-cyanethyl-N-2'-acetoxyethyl)-amino-3-acetanilide,
(N-propyl-N-2'-cyanoethoxycarbonylmethyl)-amino-3-acetanilide,
3-N,N-di-(2'-acetoxyethyl)-amino-6-ethoxy-3-acetanilide,
3-N,N-di-(2'-acetoxyethyl)-amino-6-methoxy-3-chloracetanilide,
3-N,N-di-(2'-ethoxycarbonyloxyethyl)-amino-6-ethoxy-3-methylsulfonylanilide,
3-(N-2'-cyanoethyl-N-2'-acetoxyethyl)-amino-6-methyl-3-acetanilide,
1-N,N-di-(2'-acetoxyethyl)-amino-6-ethoxy-3-propionylanilide,
1-N,N-di-(2'-acetoxyethyl)-amino-6-methoxy-3-propionylanilide,
1-N,N-di-(2'-acetoxyethyl)-amino-6-methoxy-3-acetanilide,
1-N,N-di-(2'-propionylyoxyethyl)-amino-6-methoxy-3-acetanilide,
1-N,N-di-(2'-propionyloxyethyl)-amino-6-ethoxy-3-acetanilide,
1-N-(2'-acetoxyethyl)-N-(2'-cyanoethyl)-amino-2,5-dimethoxy-benzene,
1-N,N-di-(2'-propionyloxyethyl)-6-ethoxy-3-propionylanilide,
1-N,N-di-(2'-propionyloxyethyl)-6-methoxy-3-propionylanilide,
1-N,N-di-(2'-acetoxyethyl)-amino-3-propionylanilide,
1-N,N-di-(2'-acetoxyethyl)-amino-3-acetanilide,
1-N,N-di-(2'-acetoxyethyl)-amino-6-methyl-3-acetanilide,
1-N,N-di-(2'-acetoxyethyl)-amino-6-methyl-3-propionylanilide,
1-N-(2'-cyanoethyl)-N-(2'-acetoxyethyl)-amino-6-ethoxy-3-acetanilide,
1-N-(2'-cyanoethyl)-N-(2'-acetoxyethyl)-amino-6-methoxy-3-acetanilide,
1-N-(2'-cyanoethyl)-N-(2'-methoxycarbonylethyl)-amino-6-ethoxy-3-acetanilide,
1-N,N-di-(2'-methoxycarbonylethyl)-amino-6-ethoxy-3-acetanilide,
1-N-(2'-acetoxyethyl)-N-(2'-methoxycarbonylethyl)-amino-6-ethoxy-3-acetanilide,
1-N,N-di-(2'-methoxycarbonylethyl)-amino-3-propionylanilide,
1-N,N-di-(2'-methoxycarbonylethyl)-amino-3-acetanilide,
1-N,N-di(2'-acetoxyethyl)-amino-6-ethoxy-3-ethoxycarbonylaminobenzene, 1-N,N-di-(2'-acetoxyethyl)-amino-6-ethoxy-3-(2'-chlor-ethoxycarbonyl)-aminobenzene,
1-N,N-di-(2'-cyanoacetoxyethyl)-amino-6-ethoxy-3-acetanilide,
1-N,N-di-(2'-acetoacetoxyethyl)-amino-6-ethoxy-3-acetanilide,
1-N,N-di-(2''-chloro-2'-propionyloxyethyl)-amino-6-ethoxy-3-acetanilide,
1-N,N-di-(2'-methoxyacetoxyethyl)-amino-6-ethoxy-3-acetanilide,
1-N-(2'-carbethoxyethyl)-N-(2'-cyanethyl)-amino-6-ethoxy-3-acetanilide,
1-N-(2'-cyanethyl)-N-(2'-methoxycarbonylethyl)-amino-3-propionylanilide,
1-N-(2'-cyanethyl)-N-(2'-acetoxyethyl)-amino-3-propionylanilide,
1-N-(2'-cyanoethyl)-N-(2'-acetoxyethyl)-amino-3-acetanilide,
1-N,N-di-(2'-acetoxyethyl)-amino-6-methoxy-3-(2'-methoxypropionyl)-anilide,
1-N,N-di-(2'-acetoxyethyl)-amino-6-methoxy-3-(1'-methoxypropionyl)-anilide,
1-N,N-di-(2'-acetoxyethyl)-amino-6-methoxy-3-(2'-ethoxypropionyl)-anilide,
1-N,N-di-(2'-acetoxyethyl)-amino-6-methoxy-3-phenyloxycarbonylanilide,
1-N,N-di(2-chloroacetoxyethyl)-amino-6-methoxy-3-acetanilide,
1-N-(2'-acetoxyethyl)-N-(2'-methylcarbonylethyl)-amino-6-ethoxy-acetanilide.

The coupling reaction is generally carried out in an acid, if necessary buffered medium with cooling, for example in the temperature range of 0° to 5° C.

It is of especial advantage to convert the new dyes thus obtained (which are of orange to blue hue) into dye preparations by one of the known methods before they are used. This is accomplished by comminution to an average particle size of 0.01 to 10 microns, or more particularly about 0.1 to 5 microns, if necessary in the presence of dispersants or fillers. For example, the dried dye can be ground with a dispersant and, if necessary, fillers, or it can be kneaded in paste form with a dispersant and then vacuum or jet dried. After the addition of a suitable volume of water, the resulting dye preparations are applied by dyeing, padding or printing methods. In dyeing it is general to use up to about 20 grams dye per liter, in padding up to about 150 grams, or preferably 0.1 to 100 grams, per liter, and in printing up to about 150 parts per 1000 parts of the printing paste. The liquor ratio can vary within wide limits, for example from about 1:3 to 1:200 or preferably 1:3 to 1:80.

The dyes build up excellently from aqueous dispersion on materials of fully synthetic or semi-synthetic high-molecular substances. They are especially suitable for dyeing, padding and printing polyester, cellulose acetate and cellulose triacetate fibers in the form of loose material, yarn, knit goods or woven fabric. They can also be used for dyeing synthetic polyamides, polyolefins, acrylonitrile polymerisation products and polyvinyl compounds. Dyeings of high quality are obtained on linear aromatic polyesters, which are generally the polycondensation products of terephthalic acid and glycols, notably ethylene glycol, and are sold under the registered trademarks "Terylene," "Dacron," "Diolen," etc.

The known dyeing methods are used. Polyester fibers can be exhaustion dyed in the presence of carriers in the temperature range of 80–125° C. or in the absence of carriers at about 100° to 140° C. under pressure. Materials of these fibers can be padded with aqueous dispersions of the dyes or printed with pastes, the pad dyeings or prints being fixed at about 140° to 230° C. by means of water vapor or air. In the optimum temperature range of 180–220° C. the dyes diffuse rapidly into polyester fiber and do not then sublime, even when exposed to these high temperatures for some length of time, so that inconvenient contamination of the equipment is avoided. Cellulose acetate is dyed preferably at about 65° to 80° C. and cellulose triacetate at temperatures up to about 115° C. The optimum pH region is 2 to 9 or more specifically 4 to 8.

Generally, one of the normal dispersants or a mixture of dispersants if used, preferably those of anionic or nonionic character. Often about 0.5 gram dispersant per liter of the dyeing medium is sufficient, but larger amounts, e.g. to about 3 grams per liter, can be used. Amounts greater than 5 grams do not usually offer any further advantage. Examples of known anionic dispersants which can be used in the present process are the condensation products of naphthalene sulfonic acids and formaldehyde, in particular dinaphthylmethane disulfonate, the esters of sulfonated succinic acid, Turkey red oil, the alkaline salts of the sulfuric acid esters of fatty alcohols, e.g. sodium lauryl sulfate, sodium cetylsulfate, sulfite cellulose waste liquor, or their alkaline salts, soaps, and the alkaline sulfates of the monoglycerides of fatty acids. Examples of known and very suitable nonionic dispersants are the adducts of about 3–40 mols of ethylene oxide and alkyl phenols, fatty alcohols or fatty amines, and their neutral sulfuric acid esters.

In padding and printing the normal thickening agents are used, e.g. modified or unmodified natural products such as sodium alginates, British gum, gum arabic, crystal gum, locust bean gum, gum tragacanth, carboxymethyl cellulose, hydroxyethyl cellulose, starches, and synthetic products, such as polyacrylamides and polyvinyl alcohols.

The dyeings obtained are extremely fast to thermofixation, sublimation, pleating, gas fumes, cross dyeing, dry cleaning, chlorine, and wet tests, such as washing, water and perspiration. They show good dischargeability and a good reserve of wool and cotton. The light fastness is excellent, even in pale shades, so that the new dyes are well suitable as components in dye combinations for pastel fashion shades. The dyes are stable to reduction effects at temperatures up to at least 220° C. and especially at 80–140° C. This stability is not adversely affected by the liquor ratio or by the presence of dyeing accelerants.

The blue dyes of the present invention are suitable for combination with small amounts of red dyes to give inexpensive navy blue dyeings which are fast to light, washing, perspiration, chlorine, sublimation, pleating and thermofixation, and are dischargeable. Similarly, they can be combined with red and yellow dyes to give fast black dyeings.

In the examples the parts and percentages are by weight and the temperatures in degrees centigrade.

Example 1

To 155 parts of sulfuric acid are added at 70° 7 parts of sodium nitrite, followed at 20° by 100 parts of glacial acetic acid and 28.7 parts of 1-amino-2-benzoyl-4,6-dinitrobenzene. After 2 hours the diazonium salt solution is run into a solution of 37 parts of 5-acetylamino-2-ethoxy-1-[N,N-diacetoxyethylamino]-benzene and 5 parts of aminosulfonic acid in 30 parts of glacial acetic acid and 100 parts of ice water. The coupling reaction is terminated by the addition of sodium acetate to obtain pH 4. The dye thus formed is suctioned off, washed free of acid and dried. After recrystallization from a chloroform-alcohol mixture it melts at 104° and dyes polyester fibers in blue shades with good fastness properties.

Example 2

A diazonium salt solution is prepared as described in Example 1 and run into a solution of 34 parts of 1-[N,N-diacetoxyethylamino] - 3 - propionylaminobenzene and 5 parts of aminosulfonic acid in 60 parts of glacial acetic acid and 100 parts of ice water. The coupling reaction is brought to an end by adding sufficient sodium acetate to obtain pH 4. The resulting dye is suctioned off, washed free of acid and dried. After recrystallization from a dioxan-alcohol mixture it melts at 181° and dyes polyester fibers in violet shades showing good fastness.

The dyes of Formula I enumerated in the following table are produced in accordance with the procedure described in Examples 1 and 2.

| Example | $R_1$ | $R_2$ | $R_3$ | $R_4$ | $R_5$ | $R_6$ |
|---|---|---|---|---|---|---|
| 3 | $NO_2$ | $NO_2$ | $-NHCOCH_2Cl$ | $OC_2H_5$ | $-CH_2CH_2OCOCH_3$ | $-CH_2CH_2OCOCH_3$ |
| 4 | $NO_2$ | $NO_2$ | $-NHCOOC_2H_5$ | $OC_2H_5$ | $-CH_2CH_2OCOCH_3$ | $-CH_2CH_2OCOCH_3$ |
| 5 | $NO_2$ | $NO_2$ | $-NHCOCH_3$ | H | $-C_2H_5$ | $-CH_2CH_2CN$ |
| 6 | $NO_2$ | $NO_2$ | $-NACOCH_3$ | H | $-CH_2CH_2OH_3$ | $-CH_2CH_2CN$ |
| 7 | $NO_2$ | $NO_2$ | $-NACOCH_3$ | H | $-CH_2CH_2OCOCH_3$ | $-CH_2CH_2CN$ |
| 8 | $NO_2$ | $NO_2$ | H | H | $-C_2H_5$ | $-CH_2CH_2CN$ |
| 9 | $NO_2$ | $NO_2$ | H | H | $-CH_2CH_2O-CH_3$ | $-CH_2CH_2CN$ |
| 10 | $NO_3$ | $NO_2$ | H | H | $-CH_2CH_2OCOCH_3$ | $-CH_2CH_2CN$ |
| 11 | Br | $NO_2$ | H | $OC_2H_5$ | $-CH_2CH_2OCOCH_3$ | $-CH_2CH_2CN$ |
| 12 | Br | $NO_2$ | H | $OC_2H_5$ | $-C_2H_5$ | $-CH_2CH_2CN$ |
| 13 | Br | $NO_2$ | H | $OC_2H_5$ | $-CH_2CH_2OH$ | $-CH_2CH_2CN$ |
| 14 | Br | $NO_2$ | H | $OC_2H_5$ | $-CH_2CH_2OCOCH_3$ | $-CH_2CH_2CN$ |
| 15 | Br | $NO_2$ | H | $OC_2H_5$ | $-CH_2CH_2OCOCH_3$ | $-CH_2CH_2OCOCH_3$ |
| 16 | Br | $NO_2$ | H | $OC_2H_5$ | $-CH_2CH_2OCOOC_2H_5$ | $-CH_2CH_2OCOOC_2H_5$ |
| 17 | Br | $NO_2$ | $NHCOCH_3$ | $OC_2H_5$ | $-CH_2CH_2OCOCH_3$ | $-CH_2CH_2CN$ |
| 18 | Br | $NO_2$ | $NHCOCH_3$ | $OC_2H_5$ | $-CH_2CH_2OCOCH_3$ | $-C_2H_5$ |
| 19 | Br | $NO_2$ | $NHCOCH_3$ | $OC_2H_5$ | $-CH_2CH_2OCOCH_3$ | $-CH_2CH_2OH$ |
| 20 | Br | $NO_2$ | $-NHCOC_2H_5$ | H | $-C_2H_5$ | $-C_2H_5$ |
| 21 | Br | $NO_2$ | $-NHCOC_2H_5$ | H | $-CH_2CH_2OH$ | $-CH_2CH_2OH$ |
| 22 | Br | $NO_2$ | $-NHCOC_2H_5$ | H | $-CH_2CH_2OCOCH_3$ | $-CH_2CH_2OCOCH_3$ |
| 23 | Br | $NO_2$ | H | H | $C_2H_5$ | $-CH_2CH_2CN$ |
| 24 | Br | $NO_2$ | H | H | $C_2H_5$ | $-CH_2CH_2OCH_3$ |
| 25 | Br | $NO_2$ | H | H | $-CH_2CH_2OH$ | $-CH_2CH_2CN$ |
| 26 | Br | $NO_2$ | H | H | $-CH_2CH_2OCOCH_3$ | $-CH_2CH_2CN$ |
| 27 | Cl | $NO_2$ | H | H | $-CH_2CH_2OCOCH_3$ | $-CH_2CH_2CN$ |
| 28 | Cl | $NO_2$ | H | H | $-CH_2CH_2OCOCH_3$ | $-CH_2CH_2OCOCH_3$ |
| 29 | H | $NO_2$ | H | H | $-CH_2CH_2OCOCH_3$ | $-CH_2CH_2OCOCH_3$ |
| 30 | H | $NO_2$ | H | H | $-CH_2CH_2OH$ | $-CH_2CH_2CN$ |
| 31 | H | $NO_2$ | H | H | $-CH_2CH_2OCOCH_3$ | $-CH_2CH_2CN$ |
| 32 | H | $NO_2$ | H | H | $-C_2H_5$ | $-CH_2CH_2CN$ |
| 33 | H | $NO_2$ | H | H | $-CH_2CH_2Cl$ | $-CH_2CH_2CN$ |
| 34 | H | $NO_2$ | $CH_3$ | H | $-CH_2CH_2Cl$ | $-CH_2CH_2CN$ |
| 35 | H | $NO_2$ | $CH_3$ | H | $-C_2H_5$ | $-CH_2CH_2CN$ |
| 36 | H | $NO_2$ | $CH_3$ | H | $-C_2H_5$ | $-CH_2CH_2OH$ |
| 37 | H | $NO_2$ | $CH_3$ | H | $-CH_2CH_2OH$ | $-CH_2CH_2OH$ |
| 38 | H | $NO_2$ | $-NHCOCH_3$ | H | $-CH_2CH_2OH$ | $-C_2H_5$ |
| 39 | H | $NO_2$ | $-NHCOC_2H_5$ | H | $-CH_2CH_2OH$ | $-C_2H_5$ |
| 40 | H | $NO_2$ | $-NHCOC_2H_5$ | H | $-C_2H_5$ | $-C_2H_5$ |
| 41 | H | $NO_2$ | $-NHCOC_2H_5$ | H | $-CH_2CH_2OCOCH_3$ | $-CH_2CH_2OCOCH_3$ |
| 42 | H | $NO_2$ | $-NHCOOC_2H_5$ | H | $-CH_2CH_2OCOCH_3$ | $-CH_2CH_1OCOCH_3$ |
| 43 | H | $NO_2$ | $-NHSO_3CH_3$ | H | $-CH_2CH_2OCOCH_3$ | $-CH_2CH_2OCOCH_3$ |
| 44 | H | $NO_2$ | $-NHC_2H_5$ | H | $-CH_2CH_2OCOCH_3$ | $-CH_2CH_2OCOCH_3$ |
| 45 | $SO_2CH_3$ | $NO_2$ | $NHCOCH_3$ | H | $-CH_2CH_2OCOOC_2H_5$ | $-CH_2CH_2OCOOC_2H_5$ |
| 46 | $SO_2CH_3$ | $NO_2$ | H | H | $-CH_2CH_2OCOOC_2H_5$ | $-CH_2CH_2OCOOC_2H_5$ |
| 47 | $SO_2CH_3$ | $NO_2$ | $-CH_3$ | H | $-CH_2CH_2OCOOC_2H_5$ | $-CH_1CH_2OCOOC_2H_5$ |
| 48 | H | $SO_2CH_3$ | H | H | $-C_2H_5$ | $-CH_2CH_2CN$ |
| 49 | H | $SO_2CH_3$ | H | H | $-CH_2CH_2OH$ | $-CH_2CH_2CN$ |
| 50 | H | $SO_2CH_3$ | H | H | $-CH_2CH_2OCOCH_3$ | $-CH_2CH_2CN$ |
| 51 | H | $SO_2CH_3$ | H | H | $-CH_2CH_2OCOCH_3$ | $-CH_2CH_2OCOCH_3$ |
| 52 | Cl | $SO_2CH_3$ | H | H | $-CH_2CH_2OCOCH_3$ | $-CH_2CH_2OCOCH_3$ |

| Ex. | $R_1$ | $R_2$ | $R_3$ | $R_4$ | $R_5$ | $R_6$ | Substituent on the benzene nucleus A |
|---|---|---|---|---|---|---|---|
| 53 | H | $SO_2CH_3$ | $CH_3$ | H | $-CH_2CH_2OCOCH_3$ | $-CH_2CH_2OCOCH_3$ | |
| 54 | H | $SO_2CH_3$ | $CH_3$ | H | $-CH_2CH_2CN$ | $-C_2H_5$ | |
| 55 | H | $SO_2CH_3$ | $CH_3$ | $-CH_3$ | $-CH_2CH_2CN$ | $-C_2H_5$ | |
| 56 | H | $SO_2CH_3$ | $CH_3$ | $-OCH_3$ | $-CH_2CH_2CN$ | $-C_2H_5$ | |
| 57 | Br | $SO_2CH_3$ | $CH_3$ | $-OCH_3$ | $-CH_2CH_2CN$ | $-C_2H_5$ | |
| 58 | Br | $SO_2CH_3$ | $CH_3$ | H | $-CH_2CH_2CN$ | $-C_2H_5$ | |
| 59 | $-NO_2$ | $SO_2CH_3$ | $CH_3$ | H | $-CH_2CH_2CN$ | $-C_2H_5$ | |
| 60 | $-NO_2$ | $SO_2CH_3$ | $-NHC_3H_5$ | H | $-CH_2CH_2CN$ | $-C_2H_5$ | |
| 61 | $-NO_2$ | $SO_2CH_3$ | $-NHC_3H_5$ | $-OC_2H_5$ | $-CH_2CH_2CN$ | $-C_2H_5$ | |
| 62 | $-NO_2$ | $-NO_2$ | $-NYCOCH_3$ | $-OC_2H_5$ | $-CH_2CH_2OCOCH_3$ | $-CH_2CH_2OCOCH_3$ | 4'-$CH_3$ |
| 63 | $-NO_2$ | $-NO_2$ | $-NYCOCH_3$ | $-OCH_3$ | $-CH_2CH_2OCOCH_3$ | $-CH_2CH_2OCOCH_3$ | 4'-$CH_3$ |
| 64 | $-NO_2$ | $-NO_2$ | $-NHCOCH_3$ | $-OCH_3$ | $-CH_2CH_2OCOCH_3$ | $-CH_2CH_3OCOCH_3$ | 4'-$OCH_3$ |
| 65 | $-NO_2$ | $-NO_2$ | $-NHCOCH_3$ | $-OC_2H_5$ | $-CH_2CH_2OCOCH_3$ | $-CH_2CH_2OCOCH_3$ | 4'-$OCH_3$ |
| 66 | $-NO_2$ | $-NO_2$ | $-NHCOC_2H_5$ | $-OC_2H_5$ | $-CH_2CH_2OCOCH_3$ | $-CH_2CH_2OCOCH_3$ | |
| 67 | $-NO_2$ | $-NO_2$ | $-NHCOC_2H_5$ | $-OCH_3$ | $-CH_2CH_2OCOCH_3$ | $-CH_2CH_2OCOCH_3$ | |
| 68 | $-NO_2$ | $-NO_2$ | $-NHCOCH_3$ | $-OC_2H_5$ | $-CH_2CH_2COOC_3H_7$ | $-CH_2CH_2OCOCH_3$ | |
| 69 | $-NO_2$ | $-NO_2$ | $-NHCOC_2H_5$ | $-OC_2H_5$ | $-CH_2CH_2OCOCH_3$ | $-CH_2CH_2OCOCH_3$ | |
| 70 | $-NO_2$ | $-NO_2$ | $-NHCOC_2H_5$ | $-OCH_3$ | $-CH_2CH_2OCOCH_3$ | $-CH_2CH_2OCOCH_3$ | |
| 71 | $-NO_2$ | $-NO_2$ | $-NHCOC_2H_5$ | $-CH_3$ | $-CH_2CH_2OCOCH_3$ | $-CH_2CH_2OCOCH_3$ | |
| 72 | $-NO_2$ | $-NO_2$ | $-NHCOCH_3$ | $-CH_3$ | $-CH_2CH_2OCOCH_3$ | $-CH_2CH_2CN$ | |
| 73 | $-NO_2$ | $-NO_2$ | $-NHCOCH_3$ | $-OCH_3$ | $-CH_2CH_2COOCH_3$ | $-CH_2CH_2COOCH_3$ | |
| 74 | $-NO_2$ | $-NO_2$ | $-NOCOCH_3$ | $-OCH_3$ | $-CH_2CH_2COOCH_3$ | $-CH_2CH_2COOCH_3$ | |
| 75 | $-NO_2$ | $-NO_2$ | $-NHCOC_2H_5$ | $-OC_2H_5$ | $-CH_2CH_2COOCH_3$ | $-CH_2CH_2COOCH_3$ | |
| 76 | $-NO_2$ | $-NO_2$ | $-NHCOCH_2CH_2Cl$ | $-OC_2H_5$ | $-CH_2CH_2COOCH_3$ | $-CH_2CH_2COOCH_3$ | |
| 77 | $-NO_2$ | $-NO_2$ | $-NHCOCH_3$ | $-OC_2H_5$ | $-CH_2CH_2OCOCH_2OCOCH_3$ | $-CH_2CH_2OCOCH_2OCOCH_3$ | |
| 78 | $-NO_2$ | $-NO_2$ | $-NHCH_2CH_2CH_2OCH_3$ | $-OC_2H_5$ | $-CH_2CH_2OCOCH_2OCOCH_3$ | $-CH_2CH_2OCOCH_2OCOCH_3$ | |
| 79 | $-NO_2$ | $-NO_2$ | $-NHCH_2CH_2CH_2OC_2H_5$ | $-OC_2H_5$ | $-CH_2CH_2OCOCH_2OCOCH_3$ | $-CH_2CH_2OCOCH_2OCOCH_3$ | |
| 80 | $-NO_2$ | $-NO_2$ | $-NHCOOC_6H_5$ | $-OC_2H_5$ | $-CH_2CH_2OCOCH_2OCOCH_3$ | $-CH_2CH_2OCOCH_2OCOCH_3$ | |
| 81 | $-NO_2$ | $-NO_2$ | $-NHCOCH_3$ | $-OC_2H_5$ | $-CH_2CH_2OCOCH_2Cl$ | $-CH_2CH_2OCOCH_2Cl$ | |
| 82 | $-NO_2$ | $-NO_2$ | $-NHCOCH_3$ | $-OC_2H_5$ | $-CH_2CH_2COCH_3$ | $-CH_2CH_2COCH_3$ | |
| 83 | Br | $-NO_2$ | $-NHCOCH_3$ | $-OC_2H_5$ | $-CH_2CH_2OCOCH_3$ | $-CH_2CH_2OCOCH_3$ | |
| 84 | Br | $-NO_2$ | $-NHCOCH_3$ | $-OCH_3$ | $-CH_2CH_2OCOCH_3$ | $-CH_2CH_2OCOCH_3$ | |
| 85 | Br | $-NO_2$ | $-NHCOCH_3$ | $-OCH_3$ | $-CH_2CH_2OCOCH_3$ | $-CH_2CH_2OCOCH_3$ | 4'-$CH_3$ |
| 86 | Br | $-NO_2$ | $-NHCOCH_3$ | $-OC_2H_5$ | $-CH_2CH_2OCOCH_3$ | $-CH_2CH_2OCOCH_3$ | 4'-$CH_3$ |
| 87 | Br | $-NO_2$ | $-NHCOCH_3$ | $-OC_2H_5$ | $-CH_2CH_2OCOCH_3$ | $-CH_2CH_2OCOCH_3$ | 4'-$OCH_3$ |
| 88 | Br | $-NO_2$ | $-NHCO-CH_3$ | $-OCH_3$ | $-CH_2CH_2OCOCH_3$ | $-CH_2CH_2OCOCH_3$ | 4'-$OCH_3$ |
| 89 | Cl | $-NO_2$ | $-NHCO-CH_3$ | $-OCH_3$ | $-CH_2CH_2OCOCH_2$ | $-CH_2CH_2OCOCH_3$ | 4'-$OCH_3$ |
| 90 | Cl | $-NO_2$ | $-NHCO-CH_3$ | $-OC_2H_5$ | $-CH_2CH_2OCOCH_3$ | $-CH_2CH_2OCOCH_3$ | 4'-$OCH_3$ |
| 91 | Cl | $-NO_2$ | $-NHCO-CH_3$ | $-OCH_3$ | $-CH_2CH_2OCOCH_3$ | $-CH_2CH_2OCOCH_3$ | 4'-$CH_3$ |
| 92 | Cl | $-NO_2$ | $-NHCO-CH_3$ | $-OCH_3$ | $-CH_2CH_2OCOCH_3$ | $-CH_2CH_2OCOCH_3$ | 4'-$OCH_3$ |
| 93 | Cl | $-NO_2$ | $-NHCOC_2H_5$ | $-OCH_3$ | $-CH_2CH_2OCOCH_3$ | $-CH_2CH_2OCOCH_3$ | |
| 94 | Cl | $-NO_2$ | $-NHCOC_2H_5$ | $-OC_2H_5$ | $-CH_2CH_2OCOCH_3$ | $-CH_2CH_2OCOCH_3$ | |
| 95 | Cl | $-NO_2$ | $-NHCOC_2H_5$ | H | $-CH_2CH_2OCOCH_3$ | $-CH_2CH_2OCOCH_3$ | |
| 96 | Cl | $-NO_2$ | $-NHCOC_2H_5$ | $-OC_2H_5$ | $-CH_2CH_2COOC_3H_7$ | $-CH_2CH_2COOC_3H_7$ | |
| 97 | Cl | $-NO_2$ | $-NHCOC_2H_5$ | $-OC_2H_5$ | $-CH_2CH_2COOC_3H_7$ | $-CH_2CH_2OCOCH_3$ | |
| 98 | Cl | $-NO_2$ | $-NHCOC_2H_5$ | $-OC_2H_5$ | $-CH_2CH_2OCOCH_3$ | $-CH_2CH_2OCOCH_3$ | |
| 99 | Br | $-NO_2$ | $-NHCOC_2H_5$ | $-OC_2H_5$ | $-CH_2CH_2OCOCH_3$ | $-CH_2CH_2OCOCH_3$ | |
| 100 | Br | $-NO_2$ | $-NHCOOC_2H_5$ | $-OC_2H_5$ | $-CH_2CH_2OCOCH_3$ | $-CH_2CH_2OCOCH_3$ | |
| 101 | Cl | $-NO_2$ | $-NHCOOC_2H_5$ | $-OC_2H_5$ | $-CH_2CH_2OCOCH_3$ | $-CH_2CH_2OCOCH_3$ | |
| 102 | Cl | $-NO_2$ | $-NHCOOC_6H_5$ | $-OC_2H_5$ | $-CH_2CH_2OCOCH_3$ | $-CH_2CH_2OCOCH_3$ | |
| 103 | Br | $-NO_2$ | $-NHCOOC_6H_5$ | $-OC_2H_5$ | $-CH_2CH_2OCOCH_3$ | $-CH_2CH_2OCOCH_3$ | |

| Example | R₁ | R₂ | R₃ | R₄ | R₅ | R₆ |
|---|---|---|---|---|---|---|
| 104 | Br | NO₂ | —NHCOCH₂CH₂Cl | —OC₂H₅ | —CH₂CH₂OCOCH₃ | —CH₂CH₂OCOCH₃ |
| 105 | Br | NO₂ | —NHCH₂CH₂CH₂OCH₃ | —OC₂H₅ | —CH₂CH₂OCOCH₃ | —CH₂CH₂OCOCH₃ |
| 106 | H | —SO₂N(CH₃)(CH₃) | —NHCOCH₃ | —OC₂H₅ | —CH₂CH₂OCOCH₃ | —CH₂CH₂OCOCH₃ |
| 107 | Br | —SO₂N(CH₃)(CH₃) | —NHCOCH₃ | —OC₂H₅ | —CH₂CH₂OCOCH₃ | —CH₂CH₂OCOCH₃ |
| 108 | H | —SO₂N(CH₃)(CH₃) | —NHCOCH₃ | —OC₂H₅ | —CH₂CH₂OCOOCH | —CH₂CH₂OCOOCH₃ |
| 109 | H | —SO₂N(CH₃)(CH₃) | —NHCOCH₃ | H | —CH₂CH₂OCOCH₃ | —CH₂CH₂OCOCH₃ |
| 110 | H | —SO₂N(CH₃)(CH₃) | H | H | —CH₂CH₂OCOCH₃ | —CH₂CH₂OCOCH₃ |
| 111 | H | —SO₂N(CH₃)(CH₃) | —CH₃ | H | —CH₂CH₂OCOCH₃ | —CH₂CH₂OCOCH₃ |
| 112 | H | —SO₂N(CH₃)(CH₃) | —CH₃ | H | —C₂H₅ | —CH₂CH₂CN |
| 113 | H | —SO₂N(CH₃)(CH₃) | H | H | —C₂H₅ | —CH₂CH₂CN |
| 114 | H | —SO₂N(CH₃)(CH₃) | H | H | —CH₂CH₂OH | —CH₂CH₂CN |
| 115 | H | —SO₂N(CH₃)(CH₃) | H | H | —CH₂CH₂OCOCH₃ | —CH₂CH₂CN |
| 116 | H | —SO₂C₆H₅ | —NHCOCH₃ | —OC₂H₅ | —CH₂CH₂OCOCH₃ | —CH₂CH₂CN |
| 117 | H | —SO₂CH₂C₆H₅ | —NHCOCH₃ | —OC₂H₅ | —CH₂CH₂OCOCH₃ | —CH₂CH₂CN |
| 118 | —SO₂C₆H₅ | NO₂ | —NHCOCH₃ | —OC₂H₅ | —CH₂CH₂OCOCH₃ | —CH₂CH₂CN |
| 119 | —SO₂CH₂C₆H₅ | NO₂ | —NHCOC₂H₅ | —OC₂H₅ | —CH₂CH₂OCOCH₃ | —CH₂CH₂CN |
| 120 | H | NO₂ | —NHCOC₂H₅ | H | —CH₂CH₂OCOCH₃ | —CH₂CH₂CN |
| 121 | Br | NO₂ | —NHCOCH₃ | —OC₂H₅ | —CH₂CH₂COOC₂H₅ | —CH₂CH₂COOC₂H₅ |
| 122 | Br | NO₂ | H | H | —CH₂CH₂OCOCH₃ | —CH₂CH₂OCOCH₃ |
| 123 | NO₂ | NO₂ | —NHCOCH₃ | —OC₂H₅ | —CH₂CH₂OCOCH₃ | —CH₂CH₂OCOCH₃ |
| 124 | CN | NO₂ | —NHCOCH₃ | —OC₂H₅ | —CH₂CH₂OCOCH₃ | —CH₂CH₂OCOCH₃ |
| 125 | —SO₂C₂H₅ | NO₂ | —NHCOCH₃ | —OC₂H₅ | —CH₂CH₂OCOCH₃ | —CH₂CH₂OCOCH₃ |
| 126 | —SO₂N(CH₃)(CH₃) | NO₂ | —NHCOCH₃ | —OC₂H₅ | —CH₂CH₂OCOCH₃ | —CH₂CH₂OCOCH₃ |
| 127 | —SO₂NH₂ | H | —NHCOCH₃ | —OC₂H₅ | —CH₂CH₂OCOCH₃ | —CH₂CH₂OCOCH₃ |
| 128 | Br | NO₂ | —OCH₃ | H | —CH₂CH₂OCOCH₃ | —CH₂CH₂OCOCH₃ |
| 129 | NO₂ | NO₂ | —NHCOCH₃ | —OC₂H₅ | —CH₂CH₂OCOCH₃ | —CH₂CH₂OCOCH₃ |
| 130 | H | —COOCH₃ | —NHCOCH₃ | H | —CH₂CH₂COCOCH₃ | —CH₂CH₂OCOCH₃ |
| 131 | H | —CONH₂ | —NHCOCH₃ | H | —CH₂CH₂OCOCH₃ | —CH₂CH₂OCOCH₃ |
| 132 | NO₂ | NO₂ | NHCOCH₃ | —OC₂H₅ | —CH₂CH₂COOC₂H₅ | —CH₂CH₂COOC₂H₅ |

Examples of practical application (A) A mixture of 7 parts of the dye of Example 1, 4 parts of sodium dinaphthylmethane disulfonate, 4 parts of sodium cetyl sulfate and 5 parts of water-free sodium sulfate is ground in a ball mill for 48 hours. A fine powder is obtained, 1 part of which is dispersed in a little water and the dispersion passed through a sieve into a bath of 4000 parts of water containing 2 parts of sodium lauryl sulfate. 100 parts of a scoured fabric of "Dacron" (registered trademark) polyester fiber are entered into the bath at 40–50°. The liquor ratio is thus 1:40. An emulsion of 20 parts of a chlorinated benzene in water is added, after which the bath is raised slowly to 100°. The fabric is dyed for 1–2 hours at 95–100°, then washed off, soaped, rinsed and dried. The level blue dyeing obtained is fast to light, cross dyeing, washing, water, sea water, perspiration, sublimation, gas fumes, thermofixation and pleating.

(B) A mixture of 30 parts of the dye of Example 2, 40 parts of sodium dinaphthylmethane disulfonate, 50 parts of sodium cetyl sulfate and 50 parts of water-free sodium sulfate is ground to a fine powder in a ball mill. 4 parts of this powder are dispersed in 1000 parts of water at 40–50°, and into this dyebath 100 parts of a scoured fabric of "Terylene" (registered trademark) polyester fiber are entered. The temperature of the bath is slowly increased to 130° and this temperature is held for 1 hour with pressure, after which time the fabric is removed, washed off, soaped, rinsed and dried. A violet dyeing is obtained which has the same fastness properties as that described in application Example A.

(C) In a ball mill a mixture of 20 parts of the dye of Example 1, 55 parts of sulfite cellulose waste liquor and 800 parts of water is ground until the particle size of the dye is less than 1 micron. This colloidal solution is mixed with 25 parts of ethylene diglycol monobutyl ether and 400 parts of 6% carboxymethyl cellulose to form a paste which is suitable for the melange or vigoureux printing of slubbing of "Diolen" (registered trademark) polyester fiber. The slubbing is printed with two rollers giving a coverage of 78% and without intermediate drying is steamed at 120°. Blue prints with good fastness properties are obtained.

(D) A mixture of 7 parts of the dye of Example 2, 13 parts of sulfite cellulose waste liquor and 100 parts of water is ground in a ball mill and the resulting paste jet dried. 4 parts of the paste are dispersed in a little water and the dispersion passed through a sieve into a bath of 4000 parts of water containing 4 parts of N-oleoyl-N'-hydroxyethyl-N'-(3'-sulfo-2' - hydroxypropyl) - ethylene-diamine. 100 parts of a fabric of nylon 66 polyamide fiber are introduced into the bath at 20°, the temperature is increased to 100° in 30 minutes and dyeing continued for 1 hour at 100°. The fabric is then rinsed and dried. A violet dyeing is obtained which has good fastness to light, cross dyeing, washing, water, sea water, perspiration, sublimation, rubbing and solvents.

(E) A fine aqueous dispersion of 30 parts of the dye of

Example 2, 70 parts of sodium dinaphthylmethane disulfonate and 3 parts of sodium alginate is adjusted to 1000 parts with water and stirred well. A polyester fabric is padded with this liquor at 20°, dried with air heated to 60–100° and the dyeing fixed by exposure for 1 minute to dry air at 230°, after which the fabric is rinsed, soaped, rinsed again and dried. A fast, level violet dyeing is obtained. Fabrics of synthetic polyamide fibers can be dyed in the same way.

Formulae of the representative dyes of the foregoing examples are as follows:

Example 1

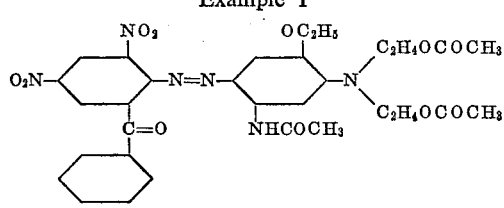

Example 4

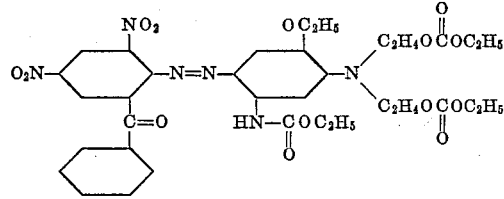

Example 2

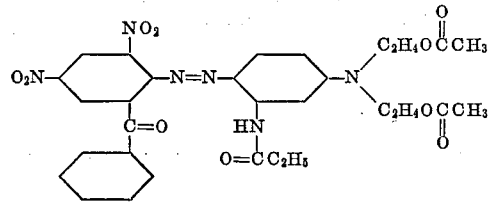

Example 29

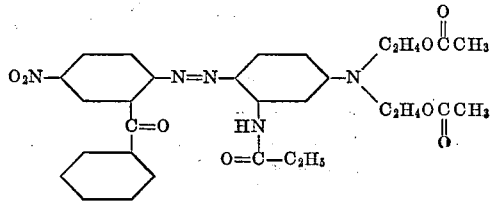

Example 120

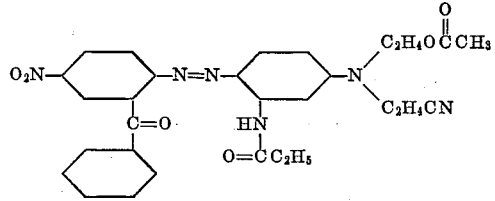

Example 31

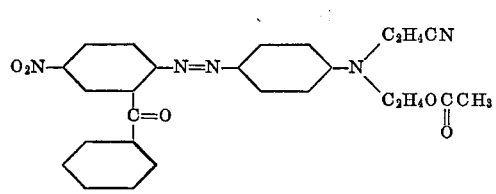

Example 32

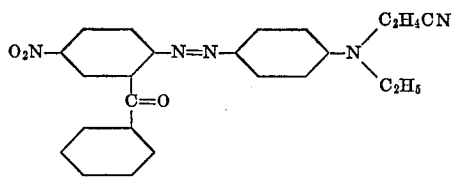

Example 83

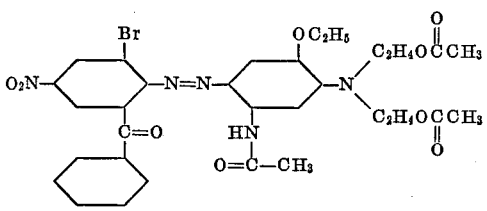

Example 121

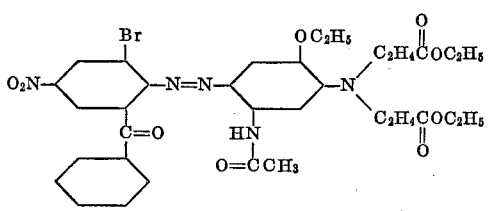

Example 122

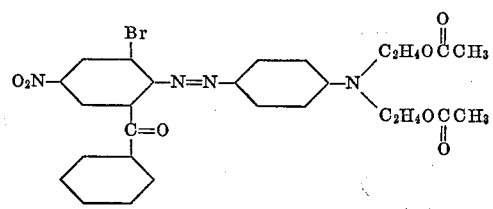

Example 26

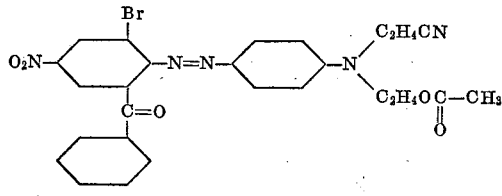

Having thus disclosed the invention what we claim is:
1. Azo dyes of the formula

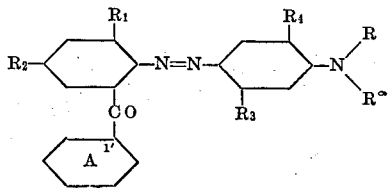

where
$R_1$ represents a member selected from the group consisting of hydrogen, chlorine and bromine, nitro, lower alkylsulfonyl, phenylsulfonyl, phenylmethylsulfonyl, aminosulfonyl, lower alkylaminosulfonyl and lower dialkylaminosulfonyl, $R_2$ represents a member selected from the group consisting of nitro, lower alkoxycarbonyl, aminocarbonyl, lower alkylaminocarbonyl, lower dialkylaminocarbonyl, lower alkylaminosulfonyl, lower dialkylaminosulfonyl, lower alkylsulfonyl, phenylsulfonyl and phenylmethylsulfonyl, $R_3$ represents a member selected from the group consisting of hydrogen, lower alkyl, lower alkoxy, lower alkylamino, α-methoxypropylamino, α-ethoxypropylamino, lower alkylcarbonylamino, chlormethylcarbonylamino, β-chlorethylcarbonylamino, lower alkoxycarbonylamino, phenoxycarbonylamino and lower alkylsulfonylamino, $R_4$ represents a member selected from the group consisting of hydrogen, lower alkyl and lower alkoxy, $R_5$ represents a member selected from the group consisting of ethyl, β-hydroxyethyl, β-chlorethyl, β-cyanoethyl, β-acetylethyl, β-acetoxyethyl, β-chloroacetoxyethyl, β-methoxycarbonyloxyethyl, β-ethoxycarbonyloxyethyl, β-methoxycarbonylethyl, β-ethoxycarbonylethyl, β-(n-propyloxycarbonyl)-ethyl, $R_6$ represents a member selected from the group consisting of ethyl, β-hydroxyethyl, β-chloroethyl, β-cyanoethyl, β-acetylethyl, β-acetoxyethyl, β-chloroacetoxyethyl, β-methoxycarbonyloxyethyl, β-ethoxycarbonyloxyethyl, β-methoxycarbonylethyl, β-ethoxycarbonylethyl, β-(n-propyloxycarbonyl)-ethyl and the nucleus A bears in the 4'-position a member selected from the group consisting of hydrogen, methyl and methoxy.

2. The dye according to claim 1 of the formula

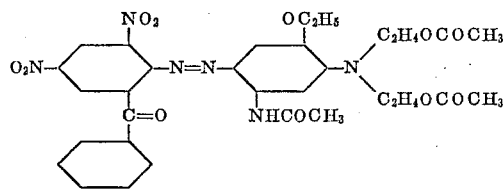

3. The dye according to claim 1 of the formula

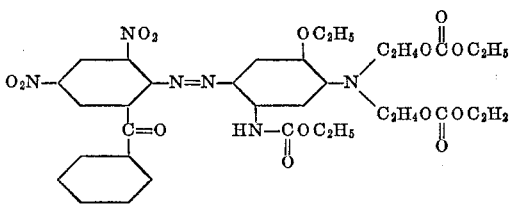

4. The dye according to claim 1 of the formula

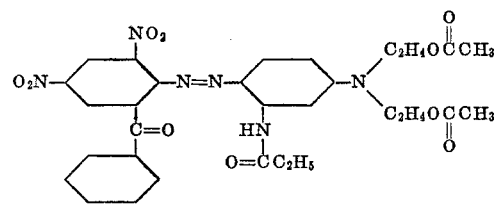

5. The dye according to claim 1 of the formula

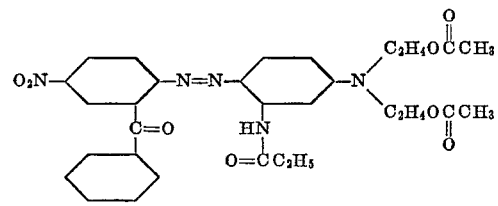

6. The dye according to claim 1 of the formula

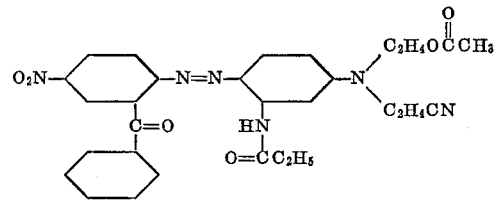

7. The dye according to claim 1 of the formula

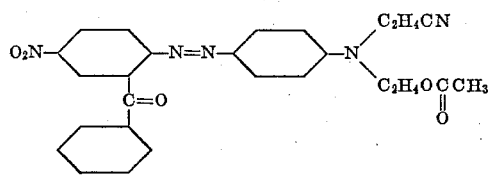

8. The dye according to claim 1 of the formula

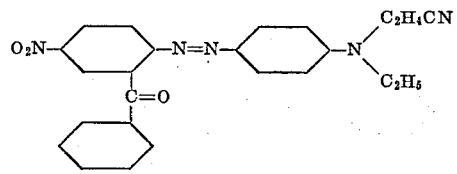

9. The dye according to claim 1 of the formula

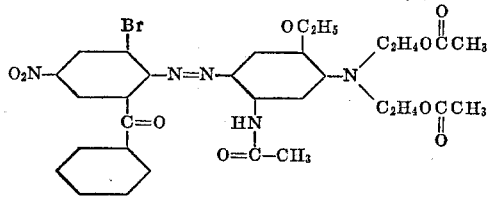

10. The dye according to claim 1 of the formula

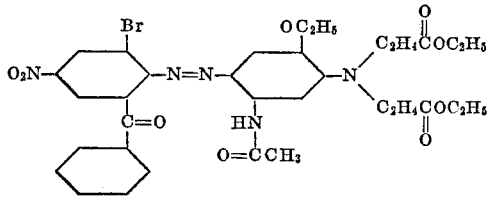

11. The dye according to claim 1 of the formula

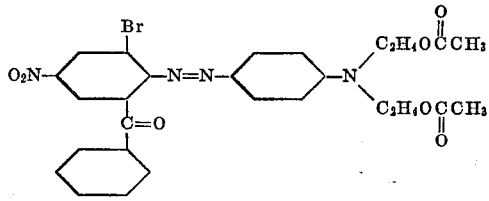

12. The dye according to claim 1 of the formula

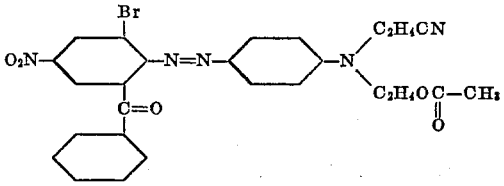

References Cited

UNITED STATES PATENTS 2,317,365   4/1943   Dickey et al. _____ 260—207

CHARLES B. PARKER, *Primary Examiner.*

D. M. PAPUGA, *Assistant Examiner.*